(12) United States Patent
Hall et al.

(10) Patent No.: US 9,638,422 B2
(45) Date of Patent: May 2, 2017

(54) ACTIVE PURGE MECHANISM WITH BACKFLOW PREVENTER FOR GAS TURBINE FUEL INJECTORS

(75) Inventors: Troy Hall, Prole, IA (US); Mark Alan Caples, Ankeny, IA (US)

(73) Assignee: Delavan Inc., West Des Moines, IA (US)

( * ) Notice: Subject to any disclaimer, the term of this patent is extended or adjusted under 35 U.S.C. 154(b) by 282 days.

(21) Appl. No.: 13/530,731

(22) Filed: Jun. 22, 2012

(65) Prior Publication Data

US 2013/0341430 A1 Dec. 26, 2013

(51) Int. Cl.
| | |
|---|---|
| *B05B 1/26* | (2006.01) |
| *F23R 3/28* | (2006.01) |
| *F02C 7/232* | (2006.01) |
| *F02M 61/16* | (2006.01) |
| *B05B 1/30* | (2006.01) |

(52) U.S. Cl.
CPC .............. *F23R 3/283* (2013.01); *F02C 7/232* (2013.01); *F02M 61/167* (2013.01); *B05B 1/302* (2013.01)

(58) Field of Classification Search
CPC ....... F02M 61/167; B05B 1/302; F02C 7/232; F23D 2209/30; F23R 3/283
USPC ............. 239/132, 501, 533.2, 570, 571; 60/39.094, 740–742, 746, 748; 2/132, 2/501, 533.2, 570, 571
See application file for complete search history.

(56) References Cited

U.S. PATENT DOCUMENTS

| | | | | |
|---|---|---|---|---|
| 3,016,705 | A * | 1/1962 | Kneidl et al. ............... | 60/39.094 |
| 4,070,826 | A * | 1/1978 | Stenger et al. .................. | 60/748 |
| 5,097,666 | A * | 3/1992 | Shekleton ............. | F02C 7/2365 |
| | | | | 60/737 |
| 5,174,504 | A * | 12/1992 | Halvorsen ...................... | 239/410 |
| 5,335,490 | A * | 8/1994 | Johnson et al. ................ | 60/764 |
| 5,579,645 | A * | 12/1996 | Prociw et al. .................. | 60/740 |
| 7,624,576 | B2 * | 12/2009 | Alkabie .................... | F02C 7/22 |
| | | | | 239/399 |
| 2002/0139121 | A1 * | 10/2002 | Cornwell et al. ................ | 60/776 |
| 2007/0193272 | A1 * | 8/2007 | Hebert et al. .................... | 60/740 |
| 2008/0286705 | A1 * | 11/2008 | Patel et al. ....................... | 431/8 |
| 2009/0211256 | A1 * | 8/2009 | Williams ......................... | 60/739 |
| 2010/0307161 | A1 * | 12/2010 | Thomson .............. | F23D 11/107 |
| | | | | 60/748 |

\* cited by examiner

*Primary Examiner* — Jason Boeckmann
(74) *Attorney, Agent, or Firm* — Locke Lord LLP; Scott D. Wofsy; Christopher J. Cillié

(57) ABSTRACT

A fuel injector for a gas turbine engine includes an injector body having a feed arm with a nozzle body mounted thereto. A fuel conduit fluidly connects a fuel inlet portion of the feed arm to a fuel circuit in the nozzle body to form a fuel path through the injector body and an insulative gap is defined between the fuel conduit and an inside of the feed arm wall to thermally insulate the fuel path of the injector body. An aperture through the feed arm wall provides fluid communication between the insulative gap and ambient conditions existing on an outside of the feed arm wall.

12 Claims, 10 Drawing Sheets

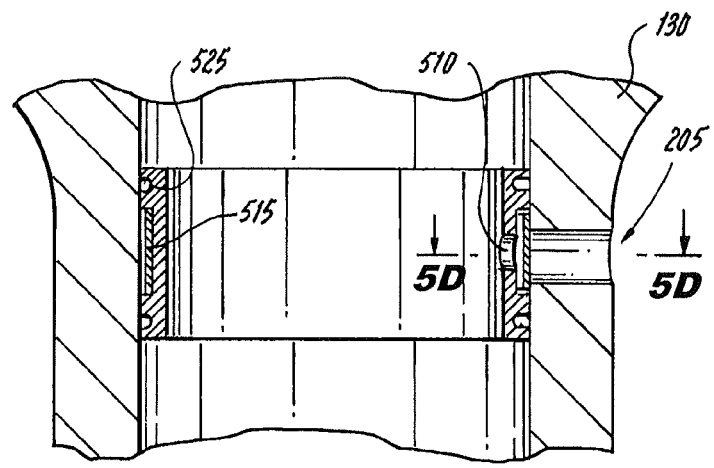
Fig. 5C
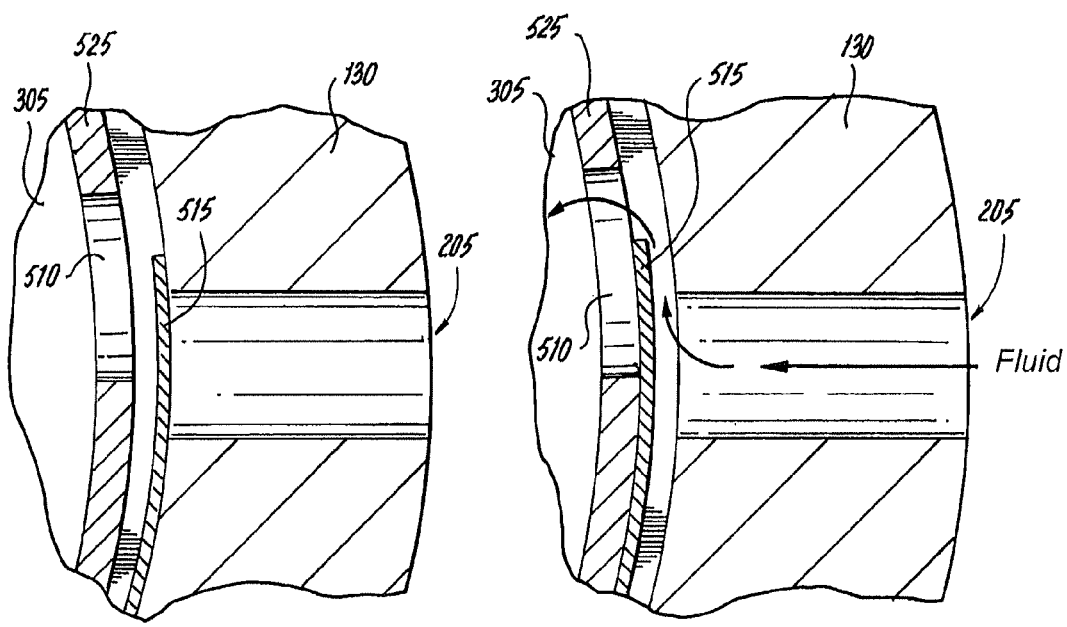
Fig. 5D  Fig. 5E

ACTIVE PURGE MECHANISM WITH BACKFLOW PREVENTER FOR GAS TURBINE FUEL INJECTORS

BACKGROUND OF THE INVENTION

1. Field of the Invention

The present invention relates to injectors and nozzles for gas turbine engines, and more particularly, to mechanisms for purging fuel within a fuel injectors for gas turbine engines.

2. Description of Related Art

A variety of devices and methods are known in the art for injecting fuel into gas turbine engines. Of such devices, many are directed to injecting fuel into combustors of gas turbine engines under high temperature conditions. For example, fuel injectors for gas turbine engines on an aircraft direct fuel from a manifold to a combustion chamber of a combustor. This fuel injector typically has an inlet fitting connected to the manifold for receiving the fuel, a fuel nozzle located within the combustor for spraying fuel into the combustion chamber, and a housing stem extending between and fluidly interconnecting the inlet fitting and the fuel nozzle. The housing stem typically has a mounting flange for attachment to the casing of the combustor.

Fuel injectors are typically heat-shielded because of high operating temperatures arising from high temperature gas turbine compressor discharge air flowing around the housing stem and nozzle. The heat shielding prevents the fuel passing through the injector from breaking down into its constituent components (i.e., "coking"), which may occur when the wetted wall temperatures of a fuel passage exceed 400° F. Coking in the fuel passages of a fuel injector can build up to restrict fuel flow to the nozzle.

Typically, conventional injectors include annular stagnant air gaps as insulation between external walls, such as those in thermal contact with high temperature ambient conditions, and internal walls in thermal contact with the fuel. In order to accommodate differential expansion of the internal and external walls while minimizing thermally induced stresses, the walls are anchored at one end and free at the other end for relative movement. If the downstream tip ends of the walls are left free for relative movement, even a close fitting sliding interface between the downstream tip ends can allow fuel to pass into the air gap formed between the walls. For example, fuel can be drawn into these air gaps due to a capillary effect due to changing pressures when the engine is shut down. Ultimately, this can result in fuel being stored in the air gaps. When the fuel becomes sufficiently heated, the fuel can break down and form carbon in the air gap, which carbon is not as good of an insulator as air, or, prior to breaking down, the fuel can even combust. Such combustion can ultimately damage the fuel injector and, in extreme cases, can damage the entire engine causing a failure. In addition, the carbon may build up to a point where it blocks venting of the air gap to the stem, which can lead to diminished injector service life and may require frequent and costly cleaning of the fuel injector.

Such conventional methods and systems generally have been considered satisfactory for their intended purpose. However, there still remains a continued need in the art for nozzles and fuel injectors that properly insulate while reducing or preventing fuel entry (and thus carbon entry) in the insulation gaps. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a fuel injector for a gas turbine engine. The fuel injector has an injector body including a feed arm having a feed arm wall, and a nozzle body connected thereto. A fuel conduit fluidly connects a fuel inlet portion of the feed arm to a fuel circuit in the nozzle body to form a fuel path through the injector body. An insulative gap is defined between an inside of the feed arm wall and the fuel conduit to thermally insulate the fuel path of the injector body. An aperture is formed through the feed arm wall. The aperture provides fluid communication between the insulative gap and ambient conditions existing outside of the feed arm wall.

In certain embodiments, a valve is disposed in the aperture to allow fluid flow (e.g., ambient air) in one direction and inhibit fluid (e.g., fuel) flow in a second direction. Moreover, the valve can include, for example: a ball check valve, a reed check valve, a Tesla valve, or any other suitable type of valves. In addition, the aperture can be defined at various suitable locations in the feed arm wall. For example, the feed arm wall can have a downstream side facing a direction common with an outlet of the nozzle body, and an upstream side facing an opposite direction of the downstream side. The aperture can be defined in the feed arm wall on the downstream side, the upstream side, or between (e.g., a lateral side) the downstream and upstream sides.

In accordance with certain other embodiments, a tortuous path or helical passages are formed relative to the inside of the feed arm wall to provide fluid communication from the aperture to the insulative gap. The tortuous path or helical passages can be configured and adapted to allow fluid flow such as a gas flow through the aperture into the insulative gap, yet also to inhibit fluid flow such as fuel flow from the insulative gap through the aperture by forming a blockage in the helical passage. For example, the fluid that flows from outside the feed arm wall into the insulative gap can be a gas such as ambient air and the fluid that is inhibited from flowing from the insulative gap to the outside of the feed arm wall can be fuel. Fuel can be inhibited by the tortuous path (e.g., slowed) and, thus, exposed to high temperatures for a period of time. At such temperatures, the fuel can "coke" (e.g., form a solid carbonaceous material) and form a blockage in the tortuous path. In this fashion, the tortuous path prevents fuel from flowing from the insulative gap through the aperture.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2 is a perspective view of an upstream face of the fuel injector, showing a feed arm having an aperture formed there-through;

FIG. 5C is a cross-sectional side elevation view of the injector in FIG. 5B, taken at cut-line 5C-5C, showing a path of fluid flow through the aperture;

FIG. 5D is a cross-sectional plan view, taken at cut-line 5D-5D of FIG. C, showing the reed check valve in closed position;

FIG. 5E is the cross-sectional plan view of FIG. 5D, showing the reed check valve in an open position;

FIG. 7A is a cross-sectional perspective view of the fuel injector of FIG. 1, showing the aperture with a Tesla valve in fluid communication there-with;

FIG. 7B is a perspective view of a top portion of the Tesla valve of FIG. 7A, showing the Tesla valve fluid pathway;

DETAILED DESCRIPTION OF THE PREFERRED EMBODIMENTS

Figure 1:
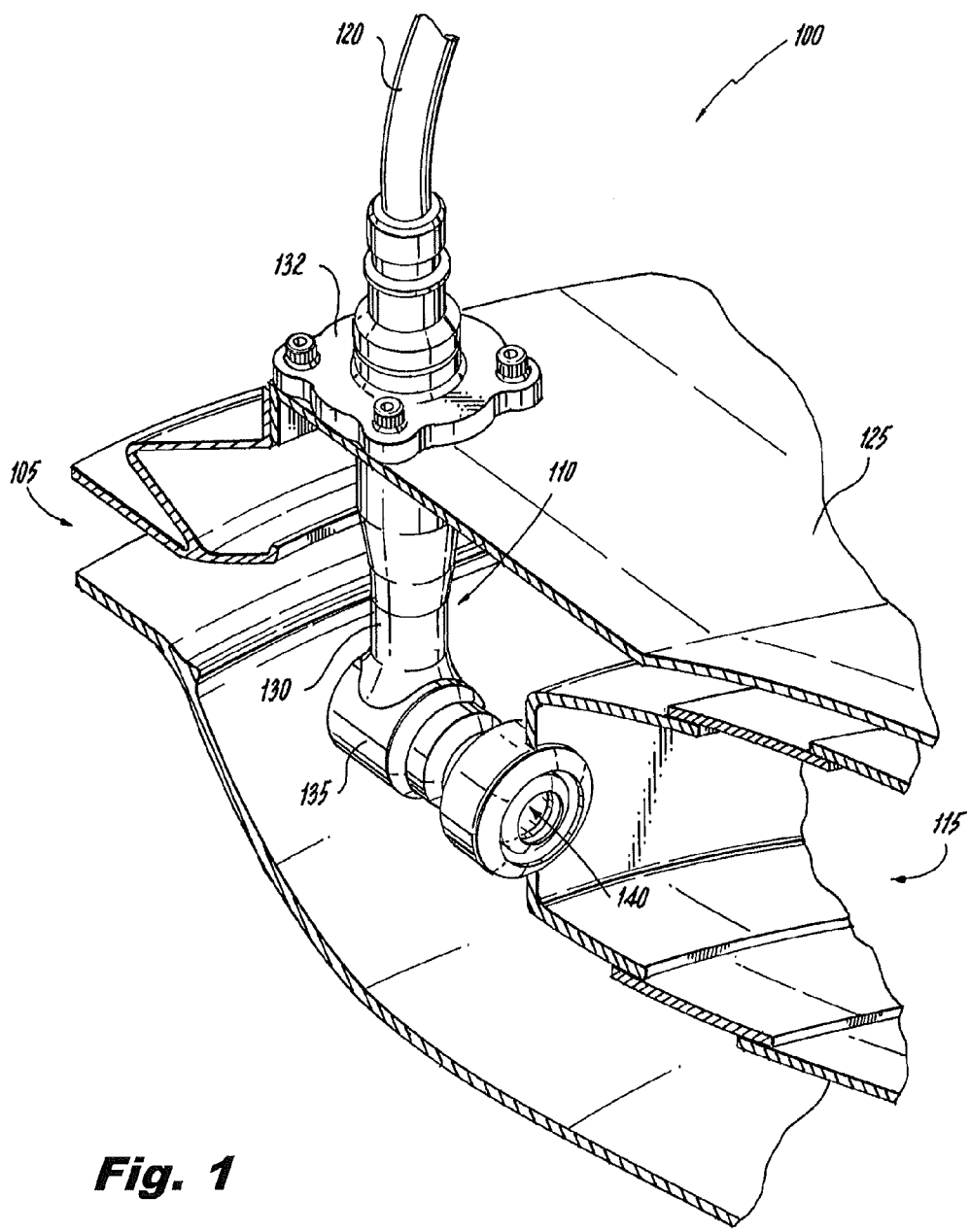
FIG. 1 is a perspective view of a first representative embodiment of an injector constructed in accordance with the present invention, showing a fuel injector with a nozzle body mounted to a gas turbine engine combustor.

Reference will now be made to the drawings wherein like reference numerals identify similar structural features or aspects of the subject invention. For purposes of explanation and illustration, and not limitation, a partial view of an exemplary embodiment of an injector in accordance with the invention is shown in FIG. 1 and is designated generally by reference character 100. Other embodiments of injectors and nozzles in accordance with the invention, or aspects thereof, are provided in FIGS. 2-8C, as will be described herein. The devices and methods of the invention can be used in gas turbine engines, or in any other suitable application, for enhanced injector performance.

As shown in FIG. 1, a portion of a typical gas turbine engine system 100 is illustrated. In operation, compressed air from a compressor (not shown) is discharged into compressor discharge chamber 105. Fuel is introduced to the compressed air by a fuel injector 110. The fuel-air mixture is then combusted in a combustion chamber 115. Fuel injector 110 receives fuel from a fuel supply line 120, and is secured to an engine housing 125 via mount fitting 132. Fuel injector 110 also includes a feed arm 130, a nozzle body 135 and a nozzle body outlet 140, which issues the fuel-air mixture to the combustion chamber 115.

Figure 2:
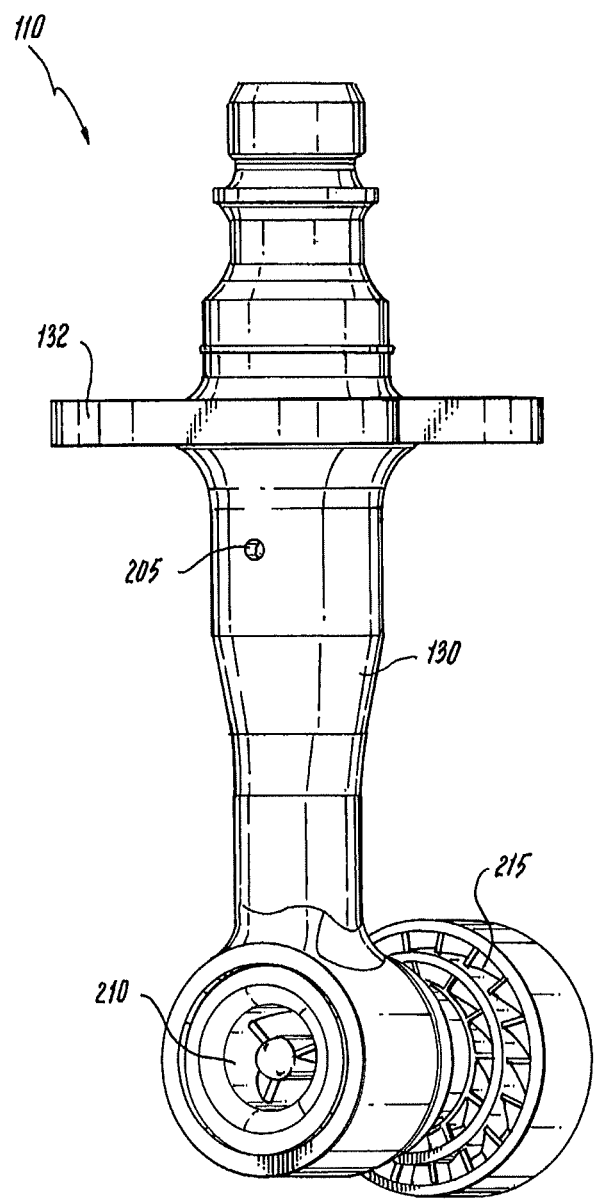

Referring now to FIG. 2, an upstream face of fuel injector 110 includes an aperture 205 formed through the wall of feed arm 130. As shown, fuel injector 110 also includes an inner air swirler 210 and an outer air swirler 215. As discussed below, aperture 205 allows ambient air to flow there-through and into an insulative gap, which, prevents capillary intake of fuel during engine operation and purges trapped fuel that enters the injector, for example upon shut-down. Notably, as discussed herein, an upstream direction and a downstream direction are defined relative to nozzle body 135.

Figure 3:
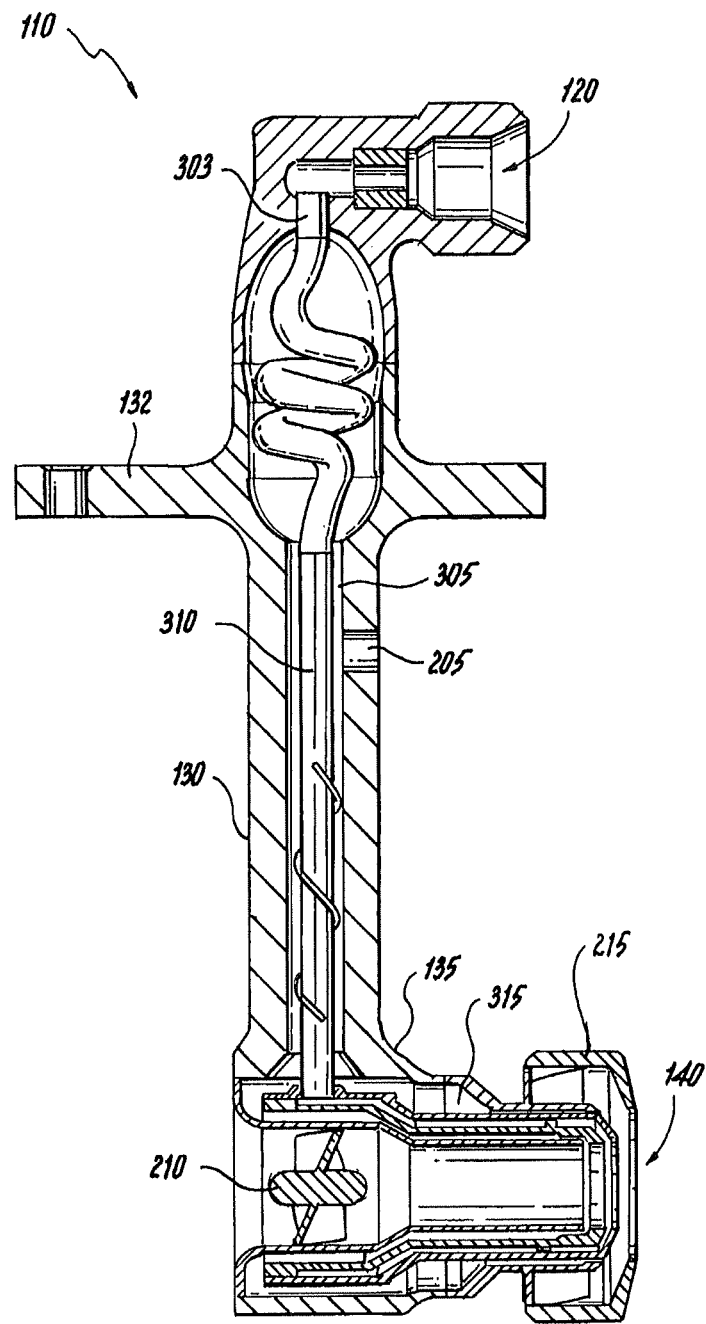
FIG. 3 is a cross-sectional side elevation view of the fuel injector, showing a fuel conduit inside the feed arm and an insulative gap.

With reference now to FIG. 3, airflow through aperture 205 into insulative gap 305 is described. A fuel supply line 120 fluidly connects to a fuel conduit 310. In particular, fuel supply line 120 provides fuel to an inlet portion 303 of feed arm 130. Fuel conduit 310 fluidly connects fuel inlet portion 303 to a fuel circuit in nozzle body 135, which forms a fuel path through injector body 110, including through inner air swirler 210 and outer air swirler 215. An insulative gap 305 inside of feed arm 130 is defined between an inner wall of feed arm 130 and fuel conduit 310.

Insulative gap 305 thermally insulates the fuel path through fuel conduit 310 from ambient conditions. Insulative gap 305 is important for reducing or preventing coking that can occur if the fuel reaches temperatures around 400° F. In operation, aperture 205 allows an effective amount of air to pass there-through and into insulative gap 305 to purge fuel from insulative gap 305, without compromising the insulative properties of insulative gap 305. The air that passes through insulative gap 305 purges fuel from insulative gap 305 from capillary intake of the fuel from nozzle body outlet 140 during engine shut-down. For example, capillary intake of fuel from nozzle body outlet 140 can occur during engine shut-down from pressure changes that naturally occur when combustion ceases (e.g., a temporary pressure vacuum can occur at nozzle body outlet 140). Further, local pressure at aperture 205 during normal engine operation (e.g., high pressure compressor discharge) is greater than local pressure conditions downstream at outlet 140. Therefore, a positive air flow exists through aperture 205 through insulative gap 305 and along fuel conduit 310 and out through nozzle body outlet 140. In this fashion, any fuel that enters the injector, during operation or shut-down conditions is purged from insulative gap 305 by air flow through aperture 205, which follows a path of less resistance through the insulative gap 305 out through nozzle body outlet 140. Moreover, the air that enters insulative gap 305 is sufficiently heated so as to remove any internal carbon deposits that can occur through a pyrolytic process.

Still referring to FIG. 3, nozzle body 135 includes additional insulative gaps 315, which further provide thermal insulation for fuel throughout the fuel circuit. These gaps may be separated from insulative gap 305 or, optionally, may be in fluid communication with insulative gap 305.

The particular location of aperture 205 disposed in feed arm 130 is exemplary only. Those skilled in the art will appreciate that aperture 205 can be disposed in feed arm 130 at any suitable location in feed arm 130 without departing form the spirit and scope of the invention. For example, the aperture can be disposed in a downstream side of the feed arm wall facing a direction common with nozzle body outlet 140, an upstream side of the feed arm wall facing an opposite direction of downstream, or in a lateral side of the feed arm wall between the upstream side and the downstream side. Preferably, the aperture is located on a downstream side and/or a lateral side so that any debris in the ambient air (e.g., from the compressor discharge chamber) does not block the aperture. Moreover, aperture 205 can be disposed in the feed arm wall in a location closer to mount fitting 132, or closer to nozzle body 135. Importantly, the pressure conditions at the position of aperture 205 should be greater than the pressure conditions of nozzle body outlet 140 such that there is positive fluid flow through insulative gap 305.

Figure 4A:
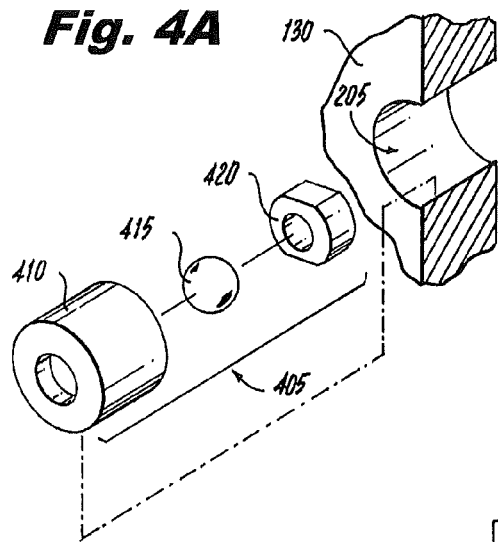
FIG. 4A is a an exploded perspective view of a ball check valve constructed in accordance with a second exemplary embodiment of the invention, showing a an inner housing, a ball, and an outer housing.
Figure 4B:
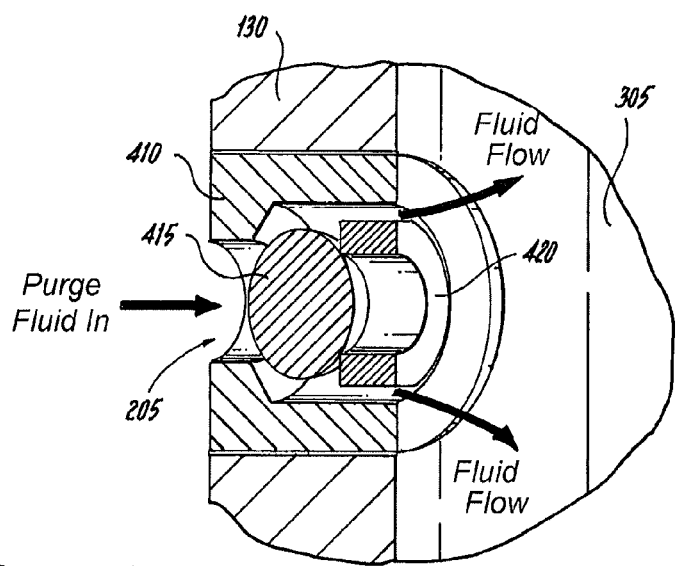
FIG. 4B is a cross-sectional perspective view of the ball check valve of FIG. 4A, shown in an open position.
Figure 4C:
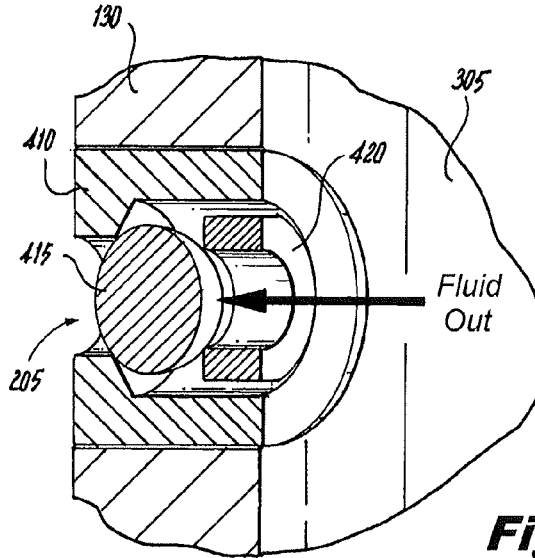
FIG. 4C is a cross-sectional perspective view of the ball check valve of FIG. 4A, shown in a closed position.

Referring now to FIGS. 4A-4C, in another exemplary embodiment a check feature disposed within aperture 205, which, in turn, is disposed within feed arm 130. Specifically, FIG. 4A illustrates a local perspective exploded view of a ball check valve 405 spaced apart from an outboard opening of aperture 205. Ball check valve 405 includes an outer housing 410, a ball 415, and an inner housing 420. Ball 415 and inner housing 420 are disposed within outer housing 410, and outer housing 410 and inner housing 420 are annular. Ball 415 travels between inner housing 420 and an inside face of outer housing 410 to define a valve open and a valve close position, respectively. That is, ball 415 communicates (e.g., sits flush with) with an opening in inner housing 420 in a valve open position and blocks the opening of outer housing 410 in a valve closed position.

Referring to FIG. 4B, the ball check valve 405 is shown in the valve open position. In the valve open position, ball 415 communicates with inner housing 420 so as to allow fluid to flow through aperture 205 (e.g., "Purge Air In", as indicated schematically in FIG. 4B). In operation, ball 415 communicates with inner housing 420 and away from aperture 205 (and away from an inner face of outer housing 410). Fluid can flow through aperture 205 around ball 415 and past two flat surfaces that are defined on the outer periphery of inner housing 420 (Ref. FIG. 4A), and into insulative gap 305. Notably, these two flat surfaces defined on the outer periphery of inner housing 420 can also include apertures, or any passage that allows fluid flow there-through or around.

FIG. 4C illustrates the ball check valve 405 in the closed position. In the closed position, ball 415 seals against outer housing 415 and blocks fluid flow outward of aperture 205. Collectively, FIGS. 4A-4C illustrate a ball check valve that allows for positive fluid flow (e.g., ambient air) into insulative gap 305, but blocks any reverse fluid flow (e.g., fuel flow) thereby preventing fuel leakage outside combustion chamber 115 through aperture 205. In this manner, ball check valve 405 allows fluid flow in one direction and inhibits fluid flow in a second (e.g., opposite) direction. For example, if there is an internal fuel leak along fuel conduit 310, ball check valve 405 functions to block any backward fuel flow into compressor discharge chamber 115 and instead promotes fuel flow into combustion chamber 115 via nozzle body outlet 140 where the wayward fuel can safely be combusted. Ball check valve 405 functions to block any wayward fuel flow since, in the event of a fuel leak, the fuel flow would provide sufficient pressure to push ball 415 into outer housing 410 thereby closing aperture 205 since the fuel pressure is typically higher than the air pressure outside aperture 205. In contrast, without the back pressure of fuel, the ambient conditions outside aperture 205 provide greater pressure than insulative gap 305, thus pushing ball 415 into inner housing 420 to open aperture 205. The check feature provides positive air flow into combustion chamber 115 via nozzle body outlet 140, while preventing fuel leakage back into compressor discharge chamber.

Those skilled in the art will readily appreciate that various types of ball check valves can be used and that the ball valve shown in FIGS. 4A-4C are exemplary only. Importantly, the ball check valve allows fluid flow in one direction, but restricts fluid flow in a different direction depending on pressure conditions.

Figure 5A:
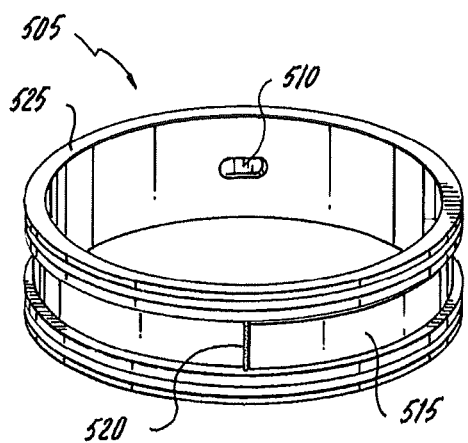
FIG. 5A is a perspective view of a reed check valve assembly.
Figure 5B:
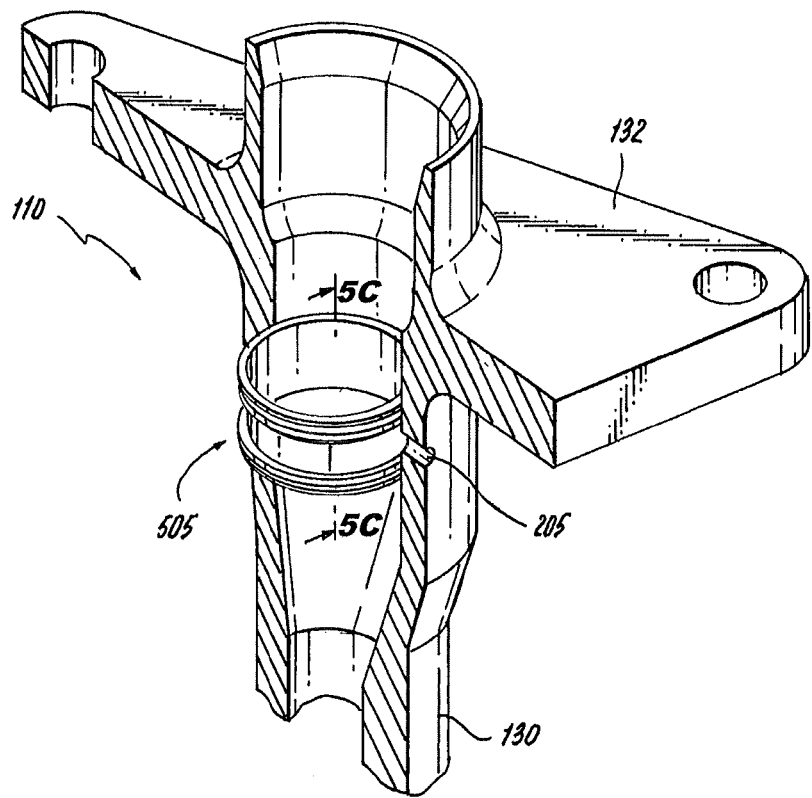
FIG. 5B is a perspective view of the fuel injector of FIG. 1, constructed in accordance with another exemplary embodiment of the invention, showing a reed check valve disposed therein.

With reference now to FIGS. 5A-5C, another exemplary embodiment of a check feature, a reed check valve 505 is described. Reed check valve 505 is disposed within insulative gap 305. FIG. 5A illustrates the reed check valve 505 in an open position. FIG. 5B shows a perspective view of the injector with a wall cutaway with the reed check valve 505 disposed therein, and FIG. 5C illustrates a sectional view of the fuel injector in FIG. 5B, taken at cut-line 5C-5C. FIGS. 5D-E illustrate a sectional plan view, taken at cut-line 5D-5D of FIG. 5C, showing the reed check valve in a closed position and an open position, respectively.

Referring again to FIG. 5A, reed check valve 505 has an annular shape with a valve plate 515 that hinges about a hinge weld 520 and is seated in a circumferential channel around a reed body 525. Hinge weld 520 can be any type of hinge fixing such as a weld, braze, a screw, etc. Importantly, the hinge allows valve plate 515 to hinge there-about. Reed check valve 505 further includes a valve port 510 that is partially covered by valve plate 515 in a valve open position. Reed check valve 505 is a thin strip constructed of heat resistant but flexible materials such as, but not limited to metals, composite materials (e.g., fiberglass or carbon fiber), combinations thereof, and any other suitable material.

Referring to FIGS. 5D and 5E, reed check valve 505 is shown a closed position and an open position, respectively. In operation, valve plate 515, at rest, is in a closed position and is biased to cover aperture 205. That is, valve plate 515 is biased away from reed body 525 to touch an inner wall of feed arm 130 and cover or close aperture 205. Fluid pressure (e.g., ambient air pressure) at aperture 205 pushes valve plate 515 away from the inner feed arm wall toward reed body 525. When valve plate 515 is open (e.g., biased away from aperture 205), valve plate 515 only partially covers valve port 510 and allows fluid to flow around reed plate 515 through valve port 510 and into insulative gap 305. Notably, reed plate 515 partially covers valve port 510. In the event of a fuel leak, as discussed above, fuel will flow outward toward aperture 205. Fuel flow presents a greater pressure than the ambient air pressure and will force valve plate 515 away from reed body 525 toward the inner feed arm wall, thereby covering and closing aperture 205. Notably, reed body 525 limits inward travel of reed plate 515 and acts as a positive rest stop. This positive rest stop eliminates vibration loading and minimizes stress applied reed to check valve 505.

Those skilled in the art will readily appreciate that various types of reed valves can be used and that the reed valve shown in FIGS. 5A-5E are exemplary only. Importantly, the reed valve allows fluid flow in one direction, but restricts fluid flow in one direction depending on pressure conditions.

Figure 6A:
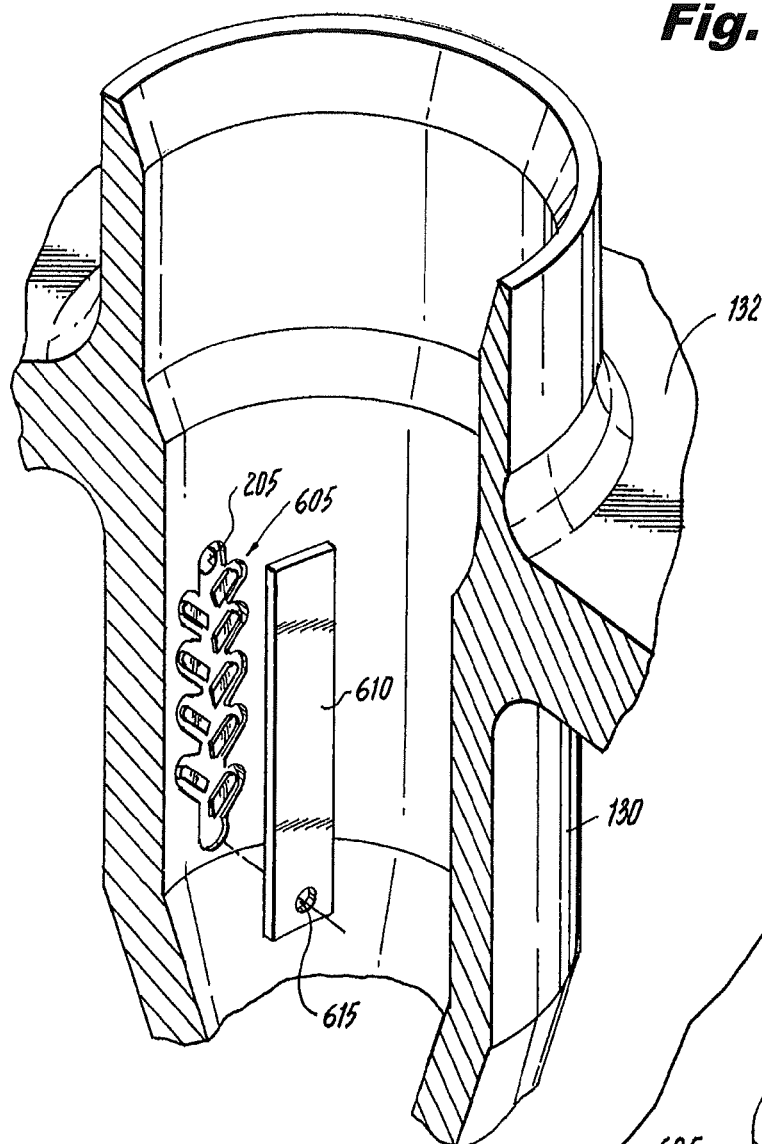
FIG. 6A is a cross-sectional perspective view of a portion of the fuel injector of FIG. 1, showing a Tesla valve disposed therein.
Figure 6B:
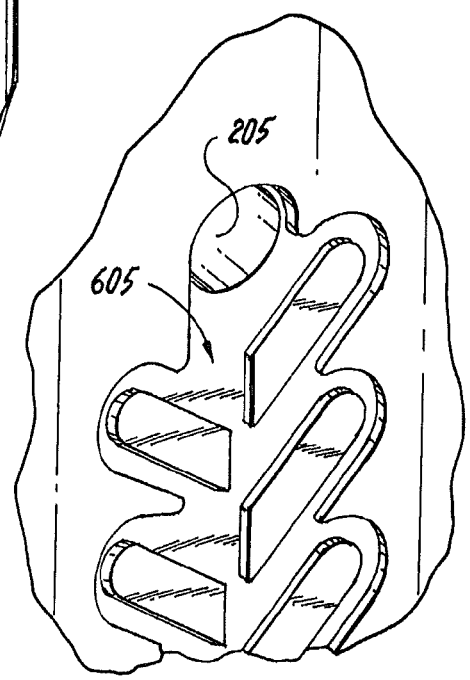
FIG. 6B is an sectional perspective view of a top portion of the Tesla valve of FIG. 6A, showing the Tesla valve defined in the feed arm wall.

Referring now to FIG. 6A-6B, an exemplary embodiment of a Tesla valve 605 is shown disposed in feed arm 130 of fuel injector 110. In particular, FIG. 6 illustrates a perspective view of feed arm 130 of the fuel injector 110, with wall cut away to reveal Tesla valve 605 disposed therein, and FIG. 6B illustrates an enlarged sectional view of a top portion of Tesla valve 605 as oriented in FIG. 6A. Tesla valve 605 can be formed in feed arm 130 using known methods of manufacture such as direct metal laser sintering, surface boring, laser etching, traditional machining techniques, or any other suitable technique. Tesla valve 605 is a one way valve that operates so as to allow fluid flow preferentially (or entirely) in one direction, while preventing fluid flow in an opposite direction. In particular, Tesla valve 605 is configured so resistance to fluid flow currents is disproportionate in two different flow directions. As shown in FIGS. 6A-6B, Tesla valve 605 is defined in feed arm wall 130. A plate 610 having an opening 615 covers Tesla valve 605 and creates a fixed path for fluid flow to and from aperture 205. Tesla valve 605, similar to the ball check valve 405 and reed check valve 505 (discussed above) provides for fluid flow into the insulative gap and prevents or discourages fluid flow back into aperture 205. Notably, Tesla valve 605 can be designed of a sufficient length so as to cause fuel flow from a fuel leak to coke and block aperture 205 and the valve path leading thereto. This is discussed in greater detail with reference to FIGS. 8A-8C below.

Figures 7A, 7B:
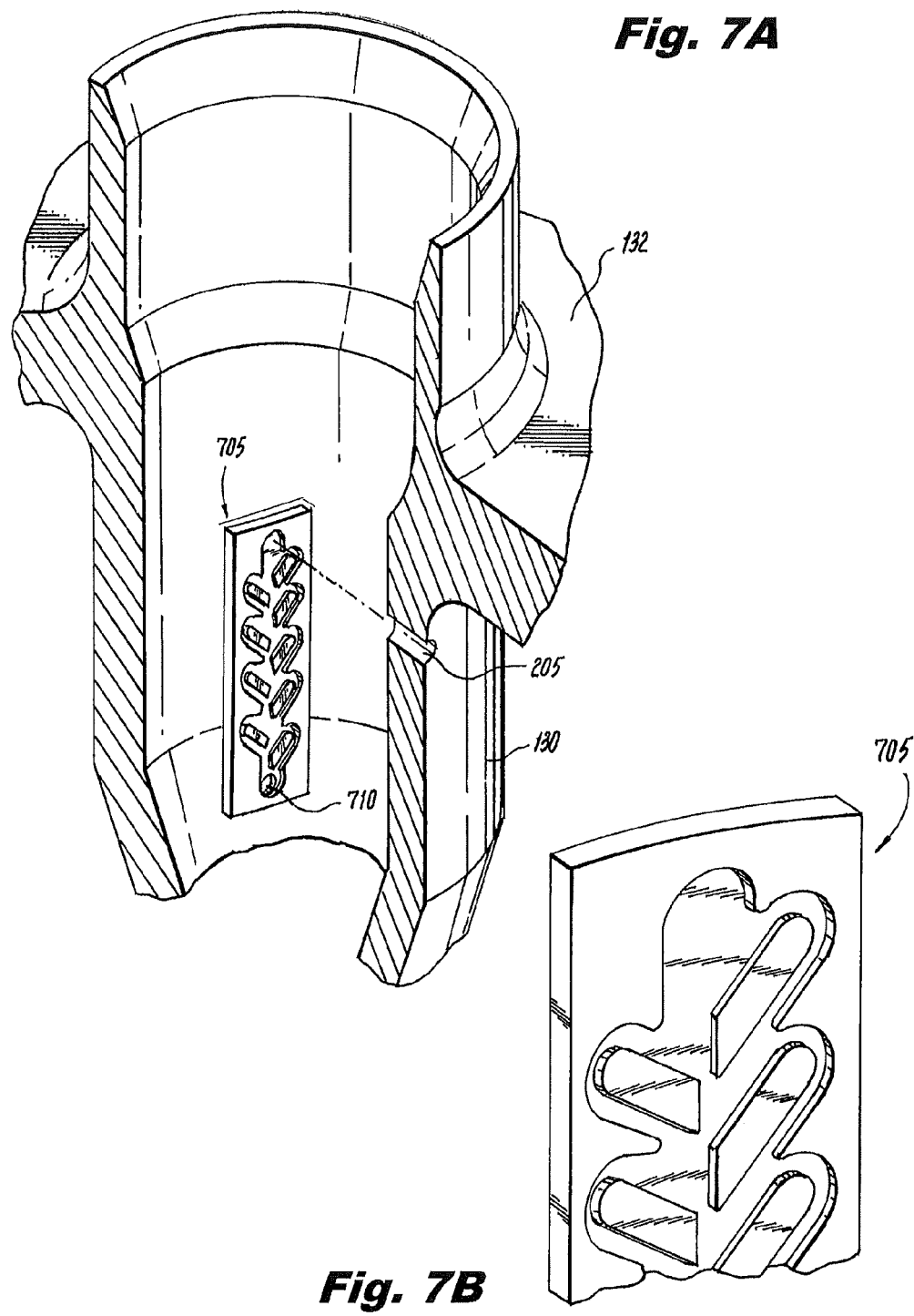

With respect to FIGS. 7A-7B, another exemplary embodiment of a Tesla valve 705 is shown as a separate structure attached to an inner wall of the feed arm 130 of fuel injector 110. In particular, FIG. 7A illustrates a perspective view of feed arm 130 having Tesla valve 705 attached thereto, and FIG. 7B illustrates an enlarged perspective view of a portion of Tesla valve 705, as oriented in FIG. 7A. In this embodiment, Tesla valve 705 is a separate structure mounted in feed arm 130 that forces fluid flow to and from aperture 205 through the Tesla valve path and out opening 710. As discussed above with reference to FIGS. 6A-6B, Tesla valve 705 provides for fluid flow into the insulative gap and prevents or discourages fluid flow back into aperture 205.

Figure 8A:
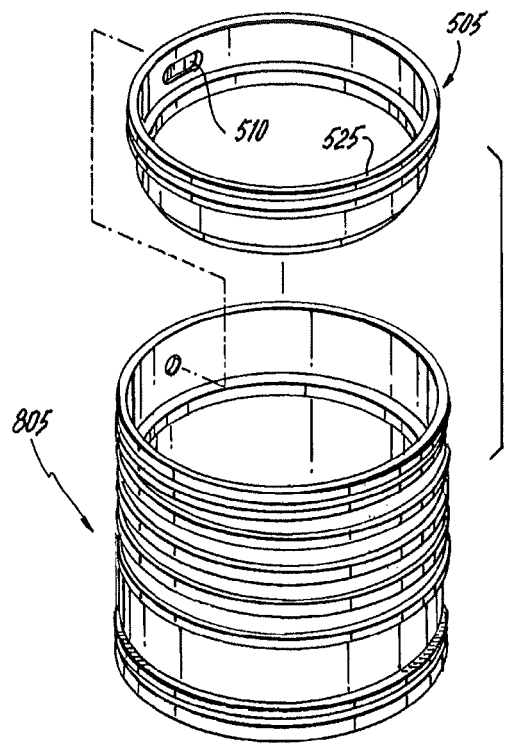
FIG. 8A is a perspective view of an exemplary embodiment of a helical passage constructed in accordance with the present invention, showing the reed check valve disposed therein.
Figure 8B:
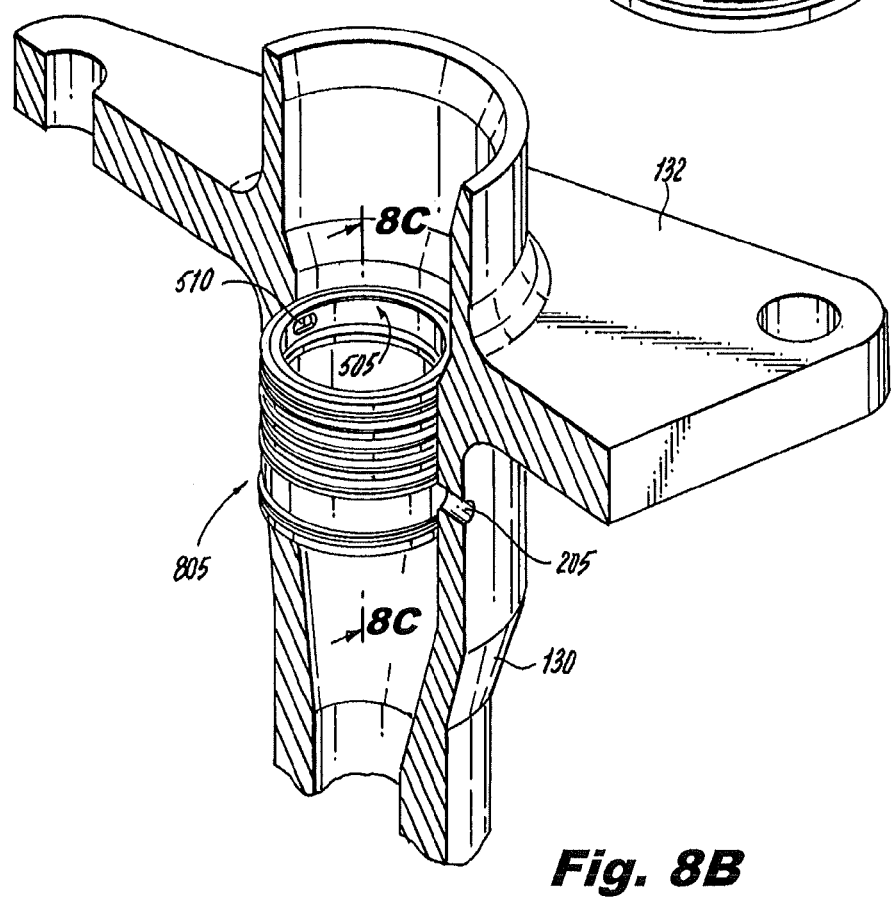
FIG. 8B is a perspective view of the fuel injector of FIG. 1, showing the helical passage of FIG. 8A and the reed check valve, disposed therein.
Figure 8C:
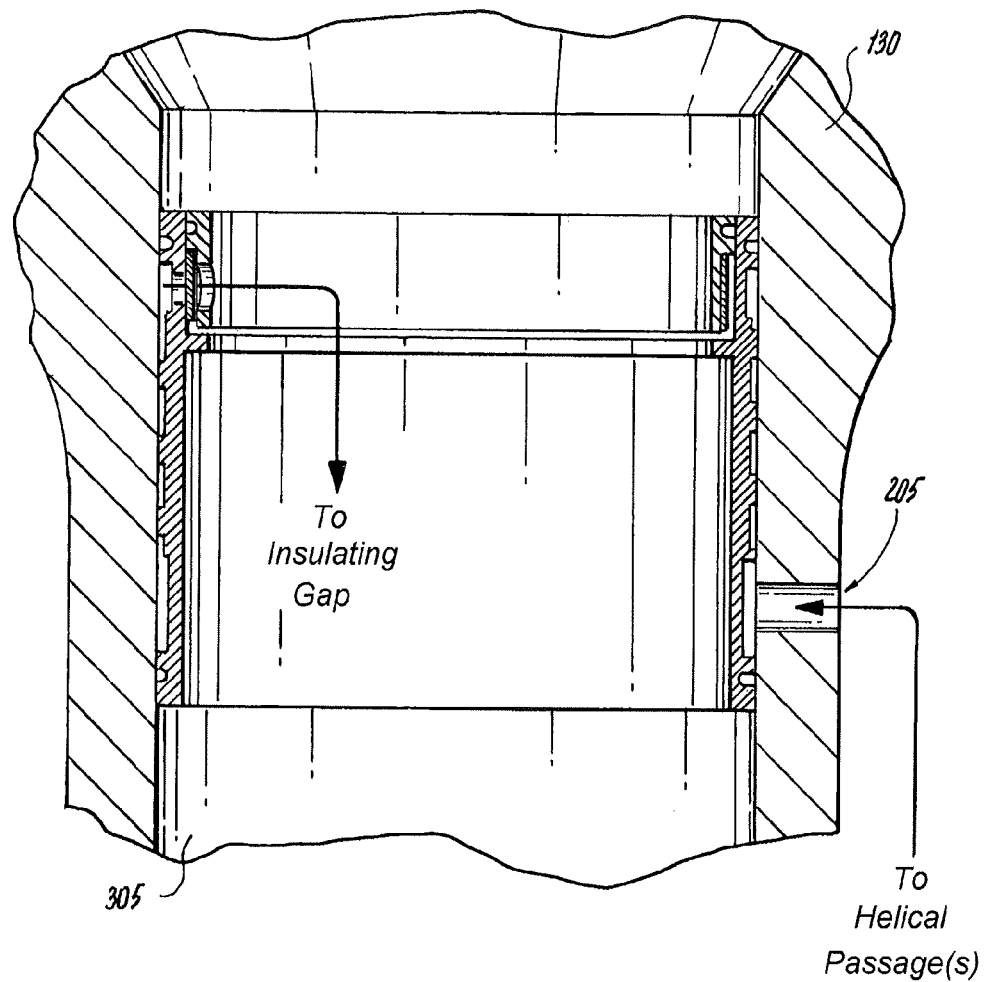
FIG. 8C is a cross-sectional elevation view, taken at cut-line 8C-8C of FIG. 8B, showing the helical passage with the reed check valve in closed position.

Referring now to FIG. 8A-8C, a helical passage 805 in combination with a reed check valve is shown. Helical passage 805 is a tortuous path that further allows fluid flow in one direction, while preventing or discouraging fluid flow in an opposite direction. In particular, FIG. 8A illustrates a perspective view of a helical passage spaced apart from the reed check valve, which is disposed therein, FIG. 8B illustrates a perspective view of the feed arm showing a wall cut away to reveal the helical passage, including the reed check valve disposed therein, and FIG. 8C illustrates a sectional plan view, taken at cut-line 8C-8C of FIG. 8B, showing the helical passage with reed check valve in an open position. Helical passage 805 prevents fluid flow out through aperture 205 in the event of a fuel leak. As discussed above, aperture 205, without additional safe guards can allow fuel to flow in the event of a fuel leak into undesirable engine areas (e.g., compressor discharge chamber 105) and cause significant damage. Helical passage 805 provides yet another form of protection against backward fluid flow in addition to the reed check valve 505. With reference to FIG. 8B, helical passage 805 is formed relative to an inside of the feed arm wall and provides fluid communication from aperture 205 to insulative gap 305. Helical passage 805 is configured and adapted to allow fluid flow (e.g., compression chamber discharge) from outside feed arm wall 130 through aperture 205 and into insulative gap 305, but inhibits fluid flow (e.g., fuel flow) passing from insulative gap 305 through aperture 205 to the outside of feed arm wall 130. Helical passage 805 forces any backward fuel flow through a torturous path (e.g., a circular screw type path), which slows the fuel flow and increases exposure to a higher temperature for a longer distance and a longer period of time than if fuel directly passed into aperture 205. Exposing the fuel to the higher temperature over the longer distance and the longer period of time promotes fuel coking (e.g. carbonization of fuel) and thus, a blockage of aperture 205. This higher temperature results from the temperature of the helical passage assembly itself. As shown in FIGS. 8A-8C, helical passage 805 can be used in conjunction with reed check valve 505. As appreciated by those skilled in the art, helical passage 805 can also be used with any of the other various check valves discussed above. Also, as appreciated by those skilled in the art helical passage 805 is shown in one configuration, with a circular type tortuous path, however, various other tortuous paths may be used without altering the spirit and scope of helical passage 805. Moreover the orientation of helical passage 805 shown in FIGS. 8A-8C is for illustration purposes only, and it is appreciated that various other orientations can be used without altering the functionality. Helical passage 805 can be constructed of metal, metal composites, or any suitable materials without altering the spirit and scope of the invention.

The techniques and systems described herein and shown in the drawings, provide for a fuel injector having superior properties that include positive fluid flow through an aperture disposed in a fuel injector feed arm so as to thermally insulate a fuel conduit and discourage and/or purge any undesirable fuel, while, at the same time, the techniques and systems further prevent or discourage fluid flow such as fuel flow from exiting the aperture into undesirable engine areas. While techniques described herein have been shown and described with reference to preferred embodiments and provide for various one way valve or tortuous path configurations that achieve these ends, alternative changes and/or modifications of these configurations will be readily appreciated by those skilled in the art without departing from the spirit and scope of the subject invention.

What is claimed is:
1. A fuel injector for a gas turbine engine, comprising:
an injector body having a feed arm with a nozzle body connected thereto, the feed arm having a feed arm wall bounding a cavity within the feed arm and supporting the nozzle body;
a single-piece fuel conduit disposed within the feed arm cavity and fluidly connecting a fuel inlet portion of the feed arm to a fuel circuit in the nozzle body to form a fuel path through the injector body;
a feed arm insulative gap bounded by an outer surface of the single-piece fuel conduit and an interior surface of the feed arm wall to thermally insulate the fuel path of the injector body;
an aperture formed through the feed arm wall and in fluid communication with an outlet of the nozzle body through the feed arm insulative gap that provides fluid communication between the feed arm insulative gap and ambient conditions existing on an outside of the feed arm wall;
a nozzle body insulative gap disposed radially outward of the fuel circuit in the nozzle body and extending about the fuel circuit in the nozzle body, the nozzle body insulative gap being in fluid communication with the feed arm insulative gap;
a helical passage disposed within the feed arm insulative gap with an inlet and an outlet, the aperture being in fluid communication with the feed arm insulative gap serially through both the inlet and the outlet of the helical passage; and
a reed valve disposed within the insulative gap and fluidly interposed between the outlet of the helical passage and the feed arm insulative gap, wherein the outlet of the helical passage is disposed axially along the feed arm on a side of the aperture opposite the nozzle body to promote fuel coking within the helical passage.

2. The fuel injector as recited in claim 1, wherein the feed arm wall has a downstream side facing a direction common with an outlet of the nozzle body, and an upstream side facing an opposite direction of the downstream side, wherein the aperture is defined in the feed arm wall on the downstream side.

3. The fuel injector as recited in claim 1, wherein the feed arm wall has a downstream side facing a direction common with an outlet of the nozzle body, and an upstream side facing an opposite direction of the downstream side, wherein the aperture is defined in the feed arm wall on the upstream side.

4. The fuel injector as recited in claim 1, wherein the feed arm wall has a downstream side facing a direction common with an outlet of the nozzle body, and an upstream side facing an opposite direction of the downstream side, wherein the aperture is defined in the feed arm wall between the upstream side and the downstream side.

5. The fuel injector as recited in claim 1, further comprising:
a tortuous path formed relative to an inside of the feed arm wall fluidly coupling the aperture to the feed arm insulative gap, wherein the tortuous path is configured and adapted to allow fluid flow through the aperture into the feed arm insulative gap, and to inhibit fluid flow from the feed arm insulative gap through the aperture to form a blockage in the tortuous path.

6. The fuel injector as recited in claim 5, wherein the tortuous path is a helical passage serially interposed between the aperture and the feed arm insulative gap, wherein the tortuous path includes a single passage extending circumferentially about the single-piece fuel conduit two or more times.

7. The fuel injector as recited in claim 5, wherein the fuel conduit is in fluid communication with the tortuous path through the feed arm insulative gap, and further including a coke deposit occluding the tortuous path.

8. The fuel injector as recited in claim 5, wherein the fluid flow through the aperture into the feed arm insulative gap is a gas flow, and the fluid flow from the feed arm insulative gap through the aperture is a fuel flow.

9. The fuel injector as recited in claim 1, wherein the nozzle body includes an insulative gap to provide thermal insulation for fuel within the fuel circuit, wherein the insulative gap is fluidly isolated from the feed arm insulative gap.

10. The fuel injector as recited in claim 1, wherein the nozzle body includes an insulative gap to provide thermal insulation for fuel within the fuel circuit, wherein the insulative gap is in fluid communication with the feed arm insulative gap.

11. The fuel injector as recited in claim 1, wherein an outlet of the nozzle body is in fluid communication with the feed arm insulative gap through an insulative gap defined within the nozzle body.

12. The fuel injector as recited in claim 1, wherein the nozzle body is an air blast nozzle body.

* * * * *